United States Patent [19]

Svejkovsky

[11] Patent Number: 5,351,807

[45] Date of Patent: Oct. 4, 1994

[54] DRIVE MECHANISM FOR A LINEAR MOTION CONVEYOR

[76] Inventor: Paul Svejkovsky, 15714 Firthridge Ct., Webster, Tex. 77598

[21] Appl. No.: 217,207

[22] Filed: Mar. 23, 1994

[51] Int. Cl.⁵ ............................................. B65G 25/00
[52] U.S. Cl. ..................................... 198/750; 198/756
[58] Field of Search ............ 198/750, 756, 760, 468.9; 414/525.1, 525.4

[56] References Cited

U.S. PATENT DOCUMENTS

| | | |
|---|---|---|
| 1,289,791 | 12/1918 | Jacobsen . |
| 1,293,556 | 2/1919 | Sandels . |
| 2,027,284 | 1/1936 | Moore . |
| 2,077,593 | 4/1937 | Sloane . |
| 2,079,360 | 5/1937 | Packer . |
| 2,447,393 | 8/1948 | Campion, Sr. . |
| 2,838,942 | 6/1958 | Gilbert . |
| 3,212,630 | 10/1965 | Allen et al. . |
| 3,236,381 | 2/1966 | Poynter . |
| 3,246,737 | 4/1966 | Allen et al. ...................... 198/756 X |
| 3,253,700 | 5/1966 | Allen et al. . |
| 3,421,637 | 1/1969 | Sofy ................................ 198/750 X |
| 3,486,608 | 12/1969 | Rogers ................................ 198/750 |
| 3,567,012 | 3/1971 | Mendoza . |
| 4,006,607 | 2/1977 | Kane . |
| 4,520,920 | 6/1985 | Ray . |
| 4,655,097 | 4/1987 | Suzuki ............................. 198/750 X |
| 5,007,491 | 4/1991 | Ide . |
| 5,046,602 | 9/1991 | Smalley et al. . |
| 5,178,258 | 1/1993 | Smalley et al. ...................... 198/750 |
| 5,263,573 | 11/1993 | Hallstrom, Jr. ...................... 198/750 |

Primary Examiner—James R. Bidwell
Attorney, Agent, or Firm—Browning, Bushman, Anderson & Brookhart

[57] ABSTRACT

A drive mechanism is provided for interconnection between a motor having a substantially constant rotational output and a linear motion conveyor. The linear motion conveyor includes a tray which may be movable in a first reciprocating direction at a slow speed, then in a backward reciprocating direction at a second speed to move goods along the tray. The drive mechanism includes universal joint for interconnection between the output shaft of the motor and a second shaft, such that the rotational speed of the second shaft varies as a function of the angle between the motor output and the second shaft output. A speed reducer is provided between the second shaft and a third shaft, and a crank interconnects the third shaft with the tray to move goods along the tray. This drive mechanism may also be used to drive a tray configured in spiral and thereby convey product vertically.

20 Claims, 3 Drawing Sheets

DRIVE MECHANISM FOR A LINEAR MOTION CONVEYOR

FIELD OF THE INVENTION

The present invention relates to a drive mechanism for moving goods along a conveyor. More particularly, this invention relates to a drive mechanism for powering a linear motion conveyor which moves goods along the conveyor without movement of the conveyor over time.

BACKGROUND OF THE INVENTION

Various types of conveyors has been used for centuries to transport goods. Roller, belt, bucket, and screw conveyors each have their own advantages, and are widely used today in numerous applications. Various mechanisms have been used to power conveyors, and to alter the speed of the conveyors and thus the speed which goods are transported along the conveyor. Patents exemplary of devices to power a conveyor and/or to vary the speed of conveyors include U.S. Pat. Nos. 4,006,607 and 5,007,491.

Those familiar with conveyors and the transportation of goods appreciate that, like other types of conveyors, a linear motion conveyor has particular advantages. A linear motion conveyor, as defined herein, includes a generally elongate horizontal tray (or a tray slightly inclined from horizontal) having a supporting surface for the goods to be transported. In a typical application, the tray is moved slowly forward (slow forward speed) to convey the goods supported thereon, and is then pulled rearward at a fast rate (high return speed) so that the goods slide along the conveyor, thereby effectively transporting the products with respect to (along) the conveyor tray. Linear motion conveyors should not be confused with other types of conveyors, such as reciprocating conveyors or reciprocating screens, shuffle conveyors, vibrating conveyors, inertial conveyors, or shaker conveyors. Each of these other types of conveyors, as disclosed in U.S. Pat. Nos. 1,289,79 1, 2,027,284, 2,077,593, 2,079,360, 2,447,393, 3,212,630, 3,236,381, 3,253,700, 5,046,602, and 5,178,258, offers its own advantages and disadvantages when compared to linear motion conveyors. The drive of a linear motion conveyor thus generates repeated acceleration and deceleration of the tray or other supporting surface for the goods. While linear motion conveyors have been used to transport various types of goods, such conveyors are particularly well suited for transporting fragile goods, such as processed foods, which frequently become damaged when transported by other conveyors. Also, a linear motion conveyor may include a unitary support tray with optional integral supporting side surfaces, and accordingly cleanliness and sanitization are easily maintained for this type of conveyor.

Prior art drive mechanisms for conveyors are disclosed in the earlier referenced patents, as well as U.S. Pat. Nos. 1,293,556, 2,838,982, 3,486,608, 3,567,012, and 4,520,920. One type of prior art mechanism for driving a linear motion conveyor is adapted to be suspended from the elongate tray. Rotating fly wheels and attached members of the drive mechanism cause the tray to move slowly forward and quickly in reverse to produce the desired motion. This drive mechanism is, however, quite costly. Moreover, existing drive mechanisms for linear motion conveyors cannot be easily optimized by adjusting the ratio of slow forward speed to fast return speed to achieve the maximum product speed along a conveyor tray. The expense of the conventional drive mechanisms for linear motion conveyors and the high cost of maintaining such drive mechanisms have thus limited the acceptance of linear motion conveyors. By lowering the cost and improving the performance characteristics of the drive mechanism, new applications for using a linear motion conveyor will occur, and new industries will benefit from these and other features of a linear motion conveyor.

The disadvantages of the prior art are overcome by the present invention, and an improved drive mechanism for a linear motion conveyor hereinafter disclosed which overcomes the disadvantages of the prior art.

SUMMARY OF THE INVENTION

The conveyor drive mechanism of the present invention may be used to convert a substantially constant rotational motion of one shaft from a conventional electric motor into rotational motion of another shaft (the drive mechanism output shaft) which alternately rotates at a slow speed and then at a fast speed. A crank is connected between the output shaft and the tray of a linear conveyor to push the conveyor slowly forward then pull the conveyor quickly backward. The relative ratio between the varying speeds of rotation of the second shaft may also be easily adjustable to optimize the driving speed for the conveyor, which desired driving speed in turn may depend upon the product being conveyed. According to the method of the present invention, once a conveyor is installed for moving a specific product at a given conveyor inclination, the angle of the shafts interconnected by the universal joint may be adjusted to obtain the maximum product speed, then the drive motor speed adjusted to convey the desired quantity of product.

To reduce overrun knocking in the conveyor drive system which may cause failure, a dampening device may be used to provide a dampening force. A linear dampener may be connected to the tray, or a rotary or a linear dampening device may be connected to one or more components of the drive mechanism, to achieve the desired dampening. Inertial loads and vibration imparted to the drive mechanism may be reduced or substantially eliminated by utilizing a counterweight that moves at the same speed as the tray, but in an opposite direction.

It is an object of the present invention to provide an improved conveyor drive mechanism which may utilize a conventional motor shaft output as a substantially constant rotational input to generate a rotational drive mechanism output which varies in an alternating manner of the function of the output rotation. The variable speed output shaft of the drive mechanism alternatively turns slower during a first rotational period, faster during a second rotational period, slower during a third rotational period, faster during a fourth rotational period, etc. The variable output shaft may be mechanically coupled with a crank to interconnect the variable speed output shaft with a tray of a linear motion conveyor.

It is a further object of the present invention to provide an improved drive mechanism for a linear motion conveyor which is relatively inexpensive and is not susceptible to high repair cost.

It is a particular feature of the drive mechanism of the present invention that the relative ratio of the slow rotation of the drive mechanism output shaft compared to the fast rotation of the shaft output may be easily optimized, so that the conveyor drive speed may be altered as a function of the particular linear motion conveyor and the product conveyed by that conveyor.

A further feature of the present invention is that the drive mechanism as disclosed herein may be utilized to drive both a substantially horizontal tray of a linear motion conveyor, or to drive an inclined tray of a generally horizontal conveyor or to drive a vertical spiral conveyor.

Still a further feature of the invention is that the drive mechanism may utilize a dampening device which provides a substantially constant dampening force to minimize knocking in the drive mechanism.

A further feature of the invention relates to the ability to easily alter the quantity of product conveyed by adjusting the drive motor speed.

It is another feature of the present invention that the drive mechanism for a linear motion conveyor may easily include a counterweight that moves at the same speed but in an opposite direction as the conveyor tray to absorb inertial loads and reduce undesirable vibration.

Yet another feature of the present invention that the drive mechanism may be configured such that the output shaft rotates at a relatively slow rotational speed during one-half of each revolution, then at a substantially fast rotational speed during the second-half of the revolution.

It is an advantage of the present invention that the drive mechanism for a linear motion conveyor is relatively simple and thus inexpensive to manufacture and easy to maintain.

A further advantage of the present invention is that the drive mechanism may be used to drive various types of linear motion conveyors, and that the speed of a linear motion conveyor may be easily adjusted without modifying the components of the drive mechanism. These features and advantages thus allow the cost of the drive mechanism to be significantly reduced by providing relatively few standard drive assemblies which can be easily modified at the conveyor site to drive the conveyor at both a preferred speed and a preferred ratio of slow forward speed/high return speed.

These and further objects, features, and advantages of the present invention would become apparent from the following detailed description, wherein reference is made to the figures in the accompanying drawings.

DETAILED DESCRIPTION OF PREFERRED EMBODIMENTS

The drive mechanism to the present invention may be interconnected between a motor or other conventional driving source which produces a substantially constant speed rotary output, and a conveyor C which includes an elongate tray T. The tray T has a horizontal or slightly inclined from horizontal supporting surface for the goods to be conveyed. Those skilled in the art will appreciate that the tray T may be reciprocated in a direction substantially aligned with axis A a relatively slow speed in one direction, then returned at a relatively fast speed in the opposite direction, thereby causing the goods supported on the tray T to move with respect to the tray T while the conveyor C remains substantially at a fixed location. The conveyor drive mechanism of the present invention reciprocates the tray T, and both the conveyor speed (the cycle time from a slow forward speed to a high return speed and then back to the same slow forward speed) and the conveyor speed ratio (the ratio between the high return speed and the slow forward speed) may be easily altered.

Figures 1, 2:
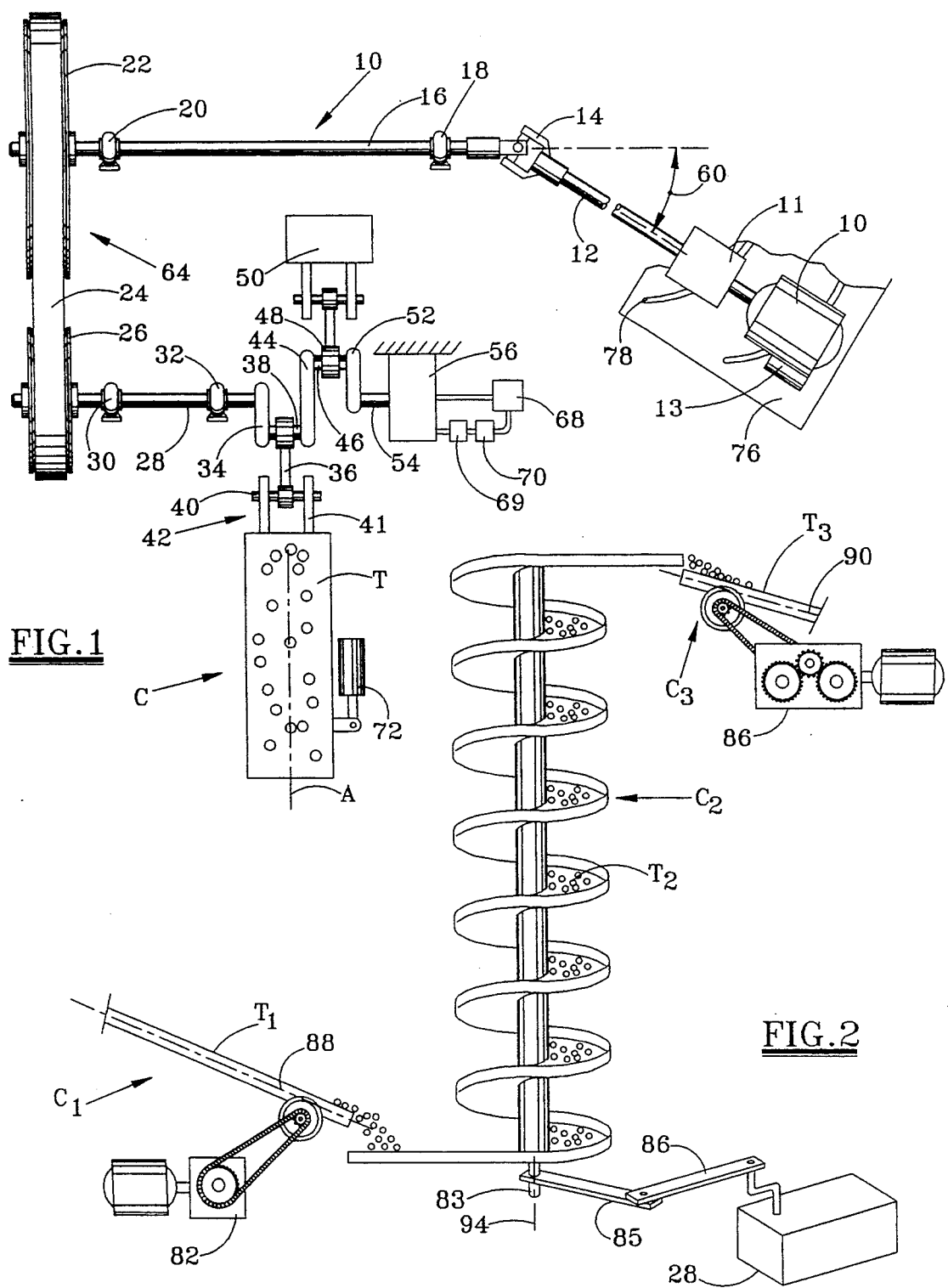
FIG. 1 is a simplified pictorial view of a suitable conveyor drive mechanism according to the present invention for powering the tray of a linear motion conveyor.
FIG. 2 is a simplified pictorial view with a spiral conveyor driven by the drive mechanism of the present invention.

An electric motor, hydraulic motor, or any other power mechanism 10 may be used to provide a rotary shaft at a substantially constant speed. If desired, a conventional gearbox or speed reducer 11 may be used to obtain the desired cost/performance from the motor 10 while also obtaining the desired rotational output speed of rotary shaft. A universal joint or Hookes joint 14 interconnects the substantially steady state or constant rotational speed shaft 12 with a second shaft 16. The rotational speed of shaft 16 varies twice per revolution according to well known principles addressed in mechanical engineering handbooks. A substantially simplistic universal joint 14 is depicted in FIG. 1, since universal joints or Hook joints are well known components to those skilled in mechanical engineering. Universal joints have been applied to various types of equipment, including motor vehicles and downhole drilling equipment, as disclosed in U.S. Pat. Nos. 4,006,607 and 5,007,491 respectively. A preferred type of universal joint will depend upon the particulars of the application. A suitable universal joint used in the development of this invention is a Model No. 35N universal joint manufactured and sold by Weasler, Inc. Commercially available rubber bushings may be used at the ends of the tray support arms, the counterweight arms, and the driving arms. A suitable bushing is the Model No. GLB 0303 bushing manufactured and sold by Great Lakes Bushing.

The variable speed second shaft 16 is conventionally mounted between a pair of bearings 18 and 20, and drives a 1:2 ratio mechanism 64 that may be any type of fixed ratio drive mechanism, such as a gearbox, a chain and sprocket drive, or by a timing belt 24 and pulleys 22 and 26 as depicted in FIG. 1. This mechanism 64 rotates a third shaft 28. The speed of shaft 28 varies once per revolution because of the 1:2 ratio mechanism (34. Shaft 28 is also mounted on conventional bearings 30 and 32 and has crank arm 34 mounted on its end. Connecting rod 36 interconnects pin 38, which is rotatably mounted between the crank arm 34 and crank arm 44, with attachment mechanism 42, thereby transmitting the force to move the tray T slowly forward and quickly in reverse as previously noted. The conveyor attachment mechanism may, in a simplistic form, comprise a pair of spaced ears 41 each securely affixed to the tray T, and a pin 40 which may rotate relative to ears 41 and the connecting rod 36. A conventional rubber bushing may be used to minimize wear.

The crank member 44 is rotatably interconnected between the pin 38 and counterweight pin 46. Connecting rod 48 is rotatably mounted on pin 46, and drives a counterweight 50 in a direction substantially parallel to the axis A. Another crank arm 52 rotatably interconnects the pin 46 with the shaft 54 for driving a dampener 56, as explained subsequently.

It may be appreciated that the conveyor drive speed, as defined parenthetically above, may be easily altered by changing the speed of the motor 10 or by utilizing a speed reducer 11. This crank mechanism converts the rotational speed, which varies alternately with each rotation of shaft 28, into a slow push, fast return linear motion. The crank mechanism accordingly may be properly timed with the universal joint.

The universal joint 14 provides the desired differential motion, twice per revolution. The conveyor speed ratio of the high return speed and the slow forward speed may thus be adjusted by varying the angle 60 between the axis of the steady speed shaft 12 and the axis of the variable speed shaft 16. Increasing the angle 60 increases the ratio between the fast speeds and slow speeds. By adjusting this angle, the ratio can be optimized for each product and each conveyor incline. The desired 1:2 ratio drive obtained from the timing belt and pulleys, or from the gearbox or chain drive, thus causes the fast and slow speeds to occur once per revolution, rather than once per one-half revolution.

If desired, motor 10 and/or speed reducer 11 may be mounted on a plate 76 fixed relative to the axis of shaft 16. The plate may include arcuate slots 78, so that the motor 10 and the speed reducer 11 may be unbolted from the plate 76, moved to increase or decrease the angle 60 to alter the conveyor speed ratio, then rebolted in place at the desired new angle. By altering the conveyor speed ratio, the product conveying speed can be optimized for each product and conveyor incline.

Drive belt and pulley subassembly 64 comprises belt 24 and pulleys 22 and 26. Subassembly 64 alters the speed of rotation of shaft 16, so that shaft 28 rotates one full turn each time shaft 16 rotates one-half turn. This technique allows the slow forward speed/high return speed of each half rotation of shaft 16 to be translated into a slow forward speed and fast return speed of each full rotation of shaft 28 to properly drive the conveyor tray T. The drive mechanism as described herein may be used to drive a horizontal conveyor tray (to convey product horizontally), a conveyor tray set on an incline (to raise the product as it is being conveyed horizontally), or a spiral conveyor tray (to convey product vertically). Those skilled in the art will appreciate that various speed reducer assemblies other than subassembly 64 may be used between shafts 16 and 28 to obtain the benefits of this invention, including chain and sprocket subassemblies and gearbox subassemblies.

The action of U-Joint 14 causes shaft 16 and subsequently the tray T and counterweight 50 to accelerate and deaccelerate. As a practical matter, the components of the gearbox 11, the U-Joint 14, and mechanism 64 have a certain amount of slack built in. As these components are accelerated and deaccelerated by U-Joint 14, this slack manifests itself as a potentially detrimental mechanical knock. The knocking is caused by the overrunning of the combined components. This condition is eliminated by providing an additional retarding force in the form of either a linear or rotational damper, as shown by mechanism 56 or 72 in FIG. 1. The product speed along the conveyor may be varied by adjusting the drive motor speed. It should be understood that shaft 54 and shaft 28 may in practice be a continuous or integral shaft.

Dampening device 56 may comprise a hydraulic fluid pump, which pumps a hydraulic fluid between reservoir 68, orifice or restriction member 69 and heat exchanger 70. The pump may but need not provide any desired purpose other than dampening the vibration on the drive assembly components, with that dampening force being translated into heat energy discharged from the heat exchanger 70. Dampening unit 56 may be provided at various locations in the system, and may for example be located at end of shaft 28 opposite the crank 34 with respect to pulley 26. While various types of dampening devices may be utilized, a mechanical/hydraulic dampening device is preferred. Another suitable dampening device, such as a hydraulic cylinder and piston assembly 72, may be connected directly to the tray T or to the connecting arm 36. The cylinder and piston assembly 72 thus acts in a manner similar to a shock absorber to provide the desired dampening function. Other types of rotary dampening devices may also be interconnected with the components of the conveyor drive assembly 10 to achieve the desired dampening while still achieving the desired movement of goods along the tray T.

The crank arm 44 and the connecting rod 48 may be configured and arranged such that counterweight 50 moves back and forth in a travel path parallel to axis A. It may be appreciated that while the tray T moves forward (down in FIG. 1), counterweight 50 moves in reverse (upward in FIG. 1). This action significantly reduces vibration and inertial loads transmitted to the supporting structure. It should be understood that all the components of the conveyor drive assembly as shown in FIG. 1 may be positioned within a chassis, cabinet, or other housing situated beneath the elongate tray of the reciprocating conveyor. This cabinet or housing may thus be fixed to the floor, and the conveyor tray supported by a plurality of arms each extending between the tray and the drive assembly cabinet.

FIG. 2 illustrates conceptually the use of this conveyor drive mechanism to move a product vertically. When the drive mechanism as shown in FIG. 1 is used to drive a substantially horizontal inclined conveyor tray, product can be conveyed with this tray inclined upward from the horizontal by up to 8° (or perhaps more in some cases). This is possible because the tray speed ratio can be optimized by adjusting the U-Joint 14 angle 60. By configuring the inclined tray into a spiral tray as depicted by C2 in FIG. 2, the product can be conveyed vertically. Tray C2 is rotated a few degrees counterclockwise slowly, and then clockwise quickly about axis 94 by arm 85, which is attached to connecting rod 86 which is driven by this conveyor drive mechanism, depicted by 28. This forward and backward motion causes the product to progress up the tray. The spiral tray accordingly is rotated forward and then backwards in very small increments by the crank mechanism described herein.

FIG. 2 also illustrates conceptually multiple conveyor drive mechanisms 82 and 86 each used to drive respective downwardly inclined reciprocating conveyors C1 and C3 simplistically depicted. Each conveyor drive mechanism may be powered by a respective electric motor and each mechanism may be substantially the same as the drive mechanism 10 discussed above. As simplistically depicted, however, drive mechanism 82 is a chain and sprocket drive subassembly, and drive mechanism 86 is a gearbox subassembly with a plurality of rotating gears. Conveyors C1 and C3 are each reciprocated along a tray axis 88 and 90, respectively, to move goods to the right with respect to a inclined tray.

It is a particular feature of the present invention to drive the linear motion conveyor with either fixed or variable output drive motor which allows the motor rotational output to be easily adjusted. According to a preferred embodiment of the invention, this adjustment may be made with an electrical inverter 13 as shown in FIG. 1 which varies the output of a conventional three phase motor 10. A suitable inverter is the model WFC 2000 AC inverter sold by Woods E-Trac. It should be understood, however, that a mechanical mechanism involving selectively positionable pulleys could be used to alter the rotational speed effectively output by the combination of the motor and mechanical spaced adjustment mechanism. By slowing the rotational output of the drive motor 10, the number of slow-forward, fast-return cycles per minute is reduced, thereby reducing the speed of the product conveyed on the tray and consequently the quantity of a product conveyed per unit time. Conversely, if the drive motor rotational output is increased, the number of slowforward, fast-return cycles per minute is increased, and the speed of the product on the tray and the quantity of product being conveyed are accordingly increased. When a conveyor is initially installed, the product to be conveyed and the inclination of the conveyor will generally be known. Angle 60 between the shafts 12 and 16 interconnected by the universal joint 14 may first be adjusted to obtain the maximum product speed, then this angle locked in place. Thereafter, the drive motor speed may be altered by utilizing the inverter 13 to convey the desired quantity of product. Once the drive motor speed has been optimized, universal joint angle 60 thereafter may again be maximized, and the system fine tuned in this manner.

In most applications, there are four variables which will affect the efficiency of product movement along the tray: (1) the crank rpm, which is a direct function of the drive motor speed, (2) the universal joint angle 60 between shafts 12 and 16, (3) the tray inclination, which is 0 degrees for a truly horizontal tray, and is inclined (typically upward) for an inclined conveyor, and (4) the timing of the universal joint with respect to the crank. According to the method of the present invention, one of these variables may be adjusted while keeping the other variables constant, and this one variable then optimized and made constant, then the other variables successively changed. Working through all of the variables in this fashion, all of the variables for a particular system can be optimized.

Figure 3:
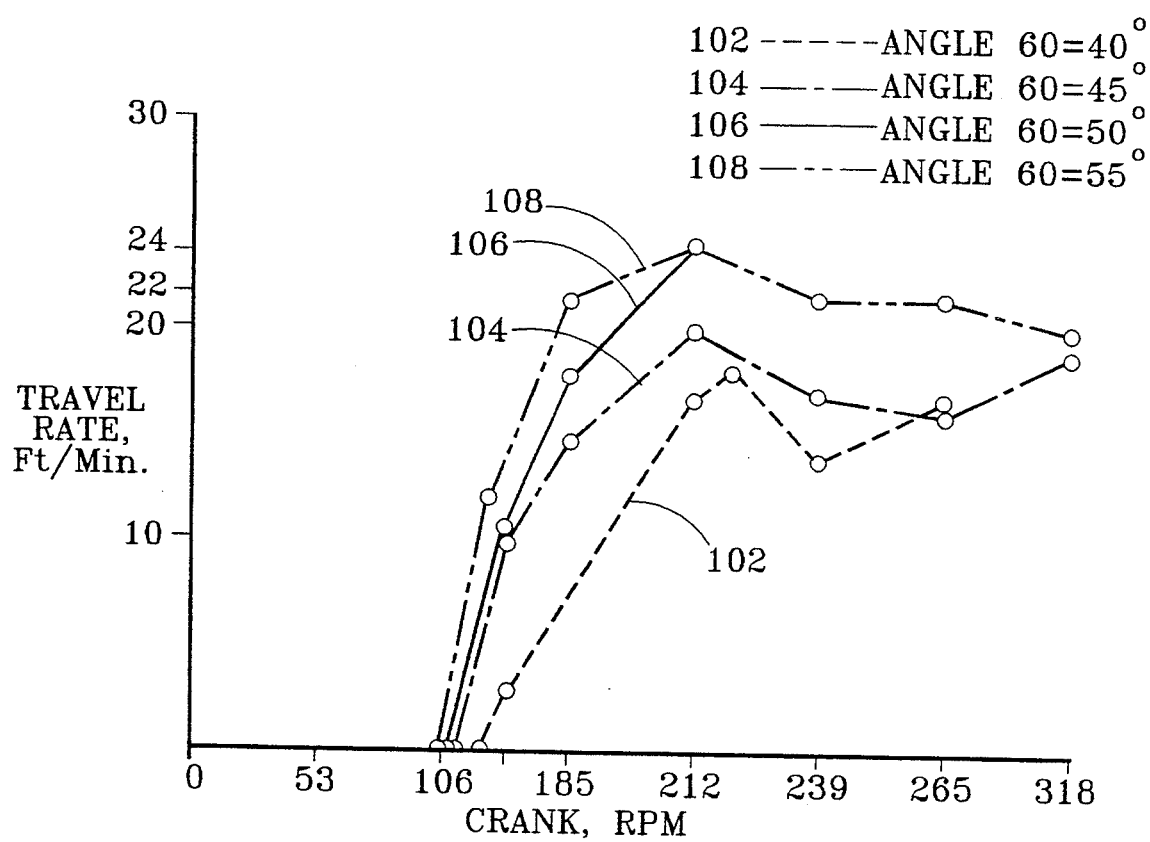
FIG. 3 graphically depict product rate along a 0 degree inclined or horizontal conveyor as a function of crank rpm for various angles for the shafts interconnected by a universal joint.

FIG. 3 graphically depicts the product travel rate in feet per minute as a function of the crank rpm for different universal joint angles. For each of the tests depicted in FIG. 3, the conveyor was horizontal or "level" so that the conveyor inclination was 0 degrees. For the test shown by line 102, the universal joint angle was set at 40 degrees. Similarly, for the test shown by plot line 104 the universal joint angle was 45 degrees, for plot line 106 the universal joint angle was 50 degrees, and for plot line 108 the universal joint angle was 55 degrees. For each of these tests, the universal joint to crank timing was set at 0 degrees. The tests were conducted at various crank rpms by varying the drive motor output with the inverter 13 until the maximum product speed was achieved. In FIG. 3, it may be seen that the optimum motor speed resulted from a crank rpm of approximately 212, with a universal joint angle of either 50 degrees or 55 degrees. High product travel speeds are desirable since they allow the trays to be made smaller (narrower and shallower) while still moving the necessary quantity of goods along the conveyor. FIG. 3 also depicts that the product travel rate can be controlled by controlling the crank rpm which, as previously noted, is a direct function of the rotational output of the drive motor. It may be seen in FIG. 3 that at a crank rpm of approximately 106, the product travel approaches 0, and that the maximum travel speed is achieved when the crank rpm is between 185 and 239 rpm. It is believed that the use of a hydraulic dampening unit as disclosed herein has a positive effect on the product travel speed along the conveyor.

Figure 4:
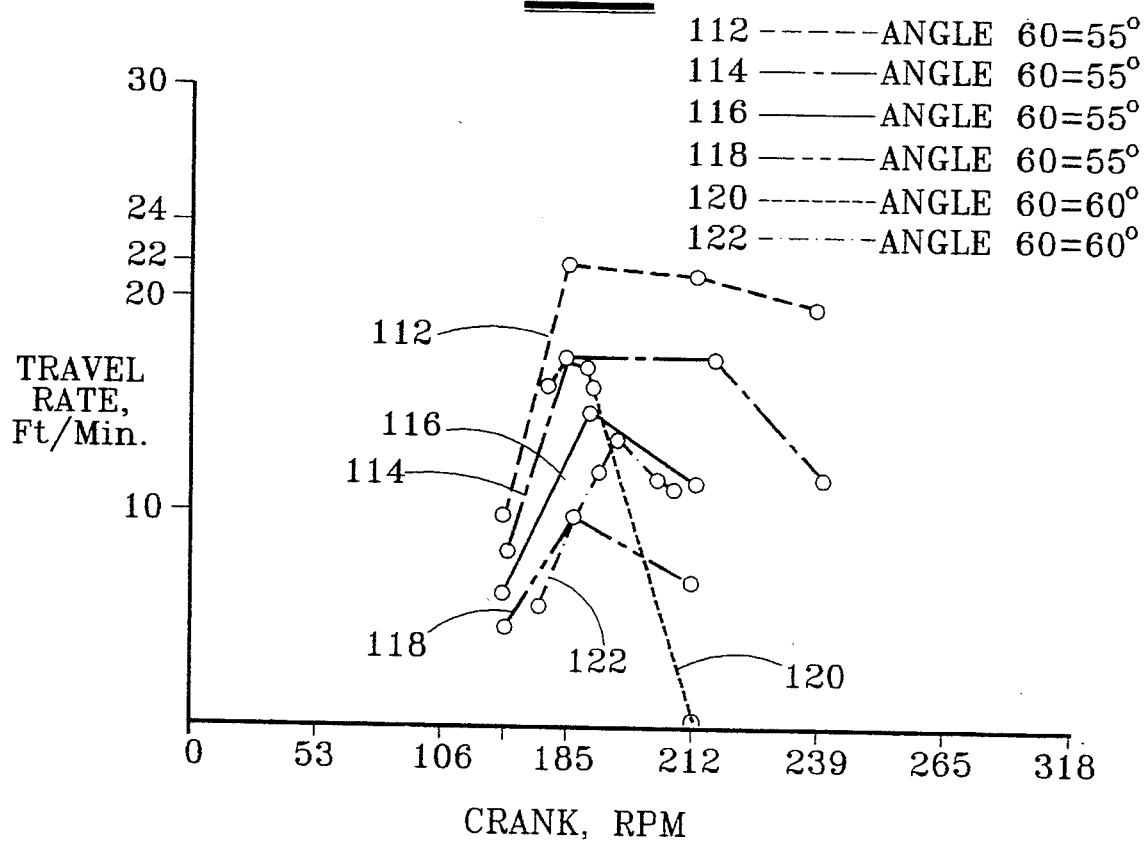
FIG. 4 graphically depicts product travel rate along various inclined conveyors as a function of crank rpm and for differing angles between the shafts interconnected by a universal joint.

FIG. 4 depicts the product travel rate in feet per minute as a function of crank rpm for various conveyor inclinations and universal joint angles. For the tests shown by plot lines 112, 114, 116 and 118, a universal joint angle 55 degrees was maintained, while the conveyor inclination was varied at 1½ degrees, 3 degrees, 4½ degrees, and 7 degrees, respectively. For the tests shown by plot lines 120 and 122, a universal joint angle was fixed at 60 degrees, and the upward conveyor inclination was 7 degrees and 8 degrees, respectively. The particular product being conveyed in FIG. 4 was potato chips, although the product characteristics did not appear to have a primary affect upon the test data. As shown in FIG. 4, when the universal angle is set at 60 degrees, the product could be conveyed up a 7 degree inclination at 13.3 feet per minute at a crank rpm of 190. The data as shown in FIG. 4 is particularly significant since prior art linear motion conveyors typically cannot convey product up a conveyor inclined at an angle in excess of about 1½ degrees.

Figure 5:
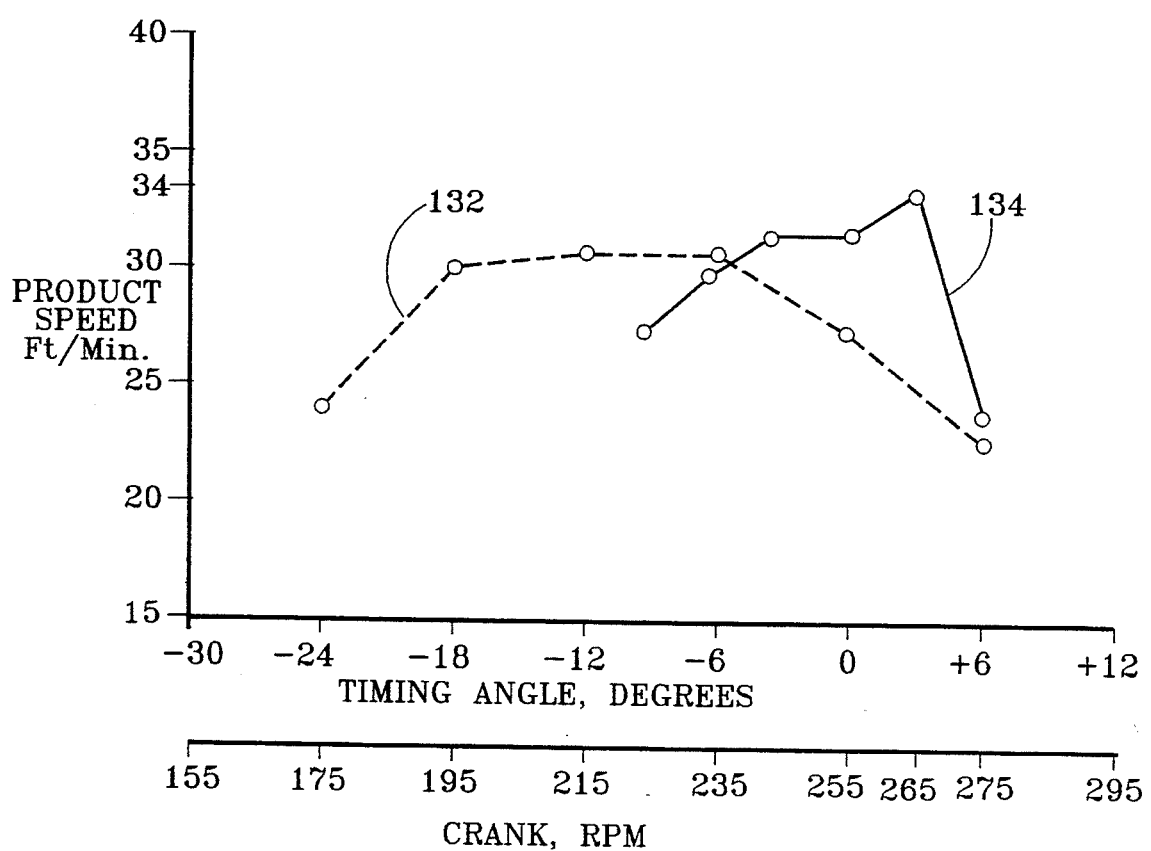
FIG. 5 graphically depicts product travel rate along a horizontal conveyor as a function of the timing angle and thus the crank rpm.

FIG. 5 graphically depicts the product speed in feet per minute as a function of the timing angle between the universal joint and the crank rpm. At a fixed average 243 crank rpm, the line plot 132 depicts that a maximum product travel speed of 32 feet per minute was obtained at a minus 6 degree timing angle for product conveyed on a horizontal conveyor. A zero degree timing angle was obtained when the tray was fully forward and the universal joint at that point where its pivot pin was vertical (see FIG. 1). A positive timing angle thus had the tray fully forward when the universal joint pin was rotated in the normal driving direction, and a negative timing angle was obtained when the tray was fully forward and the pin of the universal joint was rotationally backed up slightly from its 0 degree or vertical position. For the conveyor as shown in FIG. 5, the preferred timing angle was thus determined to be minus 6 degrees. Once this preferred timing angle was set, the motor speed and thus the average crank speed was varied, resulting in plot line 134. Plot line 134 indicates a maximum product speed for the minus 6 degree timing angle of 265 rpm. By maximizing both timing angle and motor speed, a product travel speed of 34 feet per minute was thus achieved. By maximizing the variables discussed above, the product travel rate can thus be significantly increased.

Various modifications to the equipment and to the techniques described herein should be apparent from the above description of preferred embodiments. Although the invention has thus been described in detail for these embodiments, it should be understood that this explanation is for illustration, and that the invention is not limited to these embodiments. Alternative equipment and operating techniques will thus be apparent to those skilled in the art in view of this disclosure. Modifications are thus contemplated and may be made without departing from the spirit of the invention, which is defined by the claims.

What is claimed is:

1. A drive mechanism for powering a linear motion conveyor, the linear motion conveyor including a tray movable in a forward direction at a slow speed, then in a backward direction at a fast speed to move goods along the tray, the drive mechanism comprising:
a drive motor having a first shaft with a first shaft axis, the first shaft having a substantially constant rotational output;
a second shaft having a second shaft axis inclined relative to the first shaft axis;
a universal joint for interconnecting the first shaft and the second shaft, such that the rotational speed of the second shaft varies as a function of the angle between an axis of the first shaft and the axis of the second;
a third shaft having a third shaft axis;
a speed reducer for interconnection between the second shaft and the third shaft; and
a crank interconnected between the third shaft and the tray, such that the tray moves forward during one-half rotation of the third shaft, then backward during a subsequent one-half rotation of the third shaft, thereby moving goods along the tray.

2. The drive mechanism as defined in claim 1, wherein the speed reducer has an input to output rotational speed ratio of 1:2.

3. The drive mechanism as defined in claim 1, further providing:
adjustment means for altering the inclination of the second shaft axis relative to the first shalt axis.

4. The drive mechanism as defined in claim 1, further comprising;
a dampening unit mechanically interconnected with the third shaft for dampening the driving motion of the crank.

5. The drive mechanism as defined in claim 4, wherein the dampening unit is a mechanical/hydraulic dampening unit for receiving the mechanical energy and outputting hydraulic energy to provide the dampening function.

6. The drive mechanism as defined in claim 4, wherein the dampening mechanism is a rotatory dampening mechanism comprising a hydraulic pump.

7. The drive mechanism as defined in claim 6, further comprising:
a reservoir for housing a hydraulic fluid;
an orifice for restricting flow of hydraulic fluid; and
a heat exchanger for removing heat from the hydraulic fluid.

8. The drive mechanism as defined in claim 1, further comprising:
a counterweight mechanically interconnected with the third shaft, such that the counterweight moves in a reverse direction when the tray moves in a forward direction to reduce vibration on the drive mechanism.

9. The drive mechanism as defined in claim 1, further comprising:
a connecting rod pivotably connecting the crank and the tray.

10. The drive mechanism as defined in claim 1, wherein the speed reducer includes one pulley rotatably secured to the second shaft, another pulley rotatably secured to the third shaft, and a timing belt for mechanically interconnecting the one pulley and the another pulley.

11. The drive mechanism as defined in claim 1, wherein the speed reducer includes one sprocket secured to the second shaft, another sprocket secured to the third shaft, and a chain for mechanically interconnecting the one sprocket and the another sprocket.

12. The drive mechanism as defined in claim 1, wherein the speed reducer is a gearbox assembly.

13. The drive mechanism as defined in claim 1, wherein the linear motion conveyor tray has a spiral configuration, such that the forward movement of the tray and the backward movement of the tray are each rotational tray movements.

14. A drive mechanism for powering a linear motion conveyor, the linear motion conveyor including a tray movable in a forward direction at a slow speed, then in a backward direction at a fast speed to move goods along the tray, the drive mechanism comprising:
a drive motor having a first shaft with a first shaft axis, the first shaft having a substantially constant rotational output;
a second shaft having a second shaft axis inclined relative to the first shaft axis;
a universal joint for interconnecting the first shaft and the second shaft, such that the rotational speed of the second shaft varies as a function of the angle between an axis of the first shaft and the axis of the second;
a third shaft having a third shaft axis;
a speed reducer for interconnection between the second shaft and the third shaft to double the rotational speed of the third shaft relative to the speed of the second shaft; and
a crank interconnected between the third shaft and the tray, such that the tray moves forward during one-half rotation of the third shaft, then backward during a subsequent one-half rotation of the third shaft, thereby moving goods along the tray.

15. A drive mechanism as defined in claim 14, further providing:
adjustment means for altering the inclination of the second shaft axis relative to the first shaft axis.

16. The drive mechanism as defined in claim 14, further comprising:
a dampening unit mechanically interconnected with the third shaft for dampening the driving motion of the crank.

17. The drive mechanism as defined in claim 14, further comprising:
a connecting rod pivotably connecting the crank and the tray; and
the speed reducer includes one pulley rotatably secured to the second shaft, another pulley rotatably secured to the third shaft, and a timing belt for mechanically interconnecting the one pulley and the another pulley.

18. A method of powering a linear motion conveyor, the linear motion conveyor including a tray movable in a forward direction at a slow speed, then in a backward direction at a fast speed to move goods along the tray, the method comprising:

rotating a first shaft at a substantially constant rotational output;
inclining a second shaft at a selected inclination relative to the first shaft;
interconnecting the first shaft and the second shaft with a universal joint, such that the rotational speed of the second shaft varies as a function of the rotational speed of the first shaft and the inclination between the first shaft and the axis of the second;
interconnecting the second shaft and a third shaft with a speed reducer, such that the rotational speed of the third shaft is twice the rotational speed of the second shaft; and
interconnecting the third shaft and the tray, such that the tray moves forward during one-half rotation of the third shaft, then backward during a subsequent onehalf rotation of the third shaft, thereby moving goods along the tray.

19. The method as defined in claim 18, further comprising:
    selectively adjusting the inclination of the second shaft relative to the third shaft; and
    selectively adjusting the rotational speed of the first shaft to optimize movement of the goods along the tray.

20. The method as defined in claim 18, further comprising:
    selectively adjusting the rotational timing angle of the universal joint with respect to a position of the tray; and
    selectively adjusting the rotational speed of the first shaft to optimize movement of the goods along the tray.

* * * * *

UNITED STATES PATENT AND TRADEMARK OFFICE
CERTIFICATE OF CORRECTION

PATENT NO. : 5,351,807

DATED : October 4, 1994

INVENTOR(S) : Paul Svejkovsky

It is certified that error appears in the above-identified patent and that said Letters Patent is hereby corrected as shown below:

In column 9, line 40, delete "shalt" and insert therefor --shaft--.

Signed and Sealed this

Thirteenth Day of December, 1994

Attest:

BRUCE LEHMAN

*Attesting Officer*     *Commissioner of Patents and Trademarks*